(12) United States Patent
You

(10) Patent No.: US 8,631,151 B2
(45) Date of Patent: Jan. 14, 2014

(54) TECHNIQUES FOR GUARANTEEING BANDWIDTH WITH AGGREGATE TRAFFIC

(75) Inventor: Hua You, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1390 days.

(21) Appl. No.: 11/383,980

(22) Filed: May 18, 2006

(65) Prior Publication Data

US 2008/0040504 A1    Feb. 14, 2008

(51) Int. Cl.
*G06F 15/173* (2006.01)
*H04B 10/20* (2011.01)
*H04J 3/00* (2006.01)

(52) U.S. Cl.
USPC ............... 709/238; 398/9; 398/52; 398/58; 398/66; 398/68

(58) Field of Classification Search
USPC ................... 709/223–224, 238, 240, 252
See application file for complete search history.

(56) References Cited

U.S. PATENT DOCUMENTS

| | | | |
|---|---|---|---|
| 5,347,511 A | 9/1994 | Gun | |
| 5,359,593 A | 10/1994 | Derby et al. | |
| 5,951,637 A * | 9/1999 | Kuzma | 709/204 |
| 5,982,748 A | 11/1999 | Yin et al. | |
| 6,041,359 A * | 3/2000 | Birdwell | 709/238 |
| 6,477,582 B1 | 11/2002 | Luo et al. | |
| 7,047,311 B2 | 5/2006 | Oishi et al. | |
| 7,233,574 B2 * | 6/2007 | Worfolk et al. | 370/238 |
| 7,362,975 B2 * | 4/2008 | Choi et al. | 398/58 |
| 8,305,895 B2 * | 11/2012 | Chang et al. | 370/232 |
| 2002/0120745 A1 | 8/2002 | Oishi et al. | |
| 2003/0099199 A1 | 5/2003 | Kiremidjian et al. | |
| 2003/0140165 A1 * | 7/2003 | Chiu et al. | 709/238 |
| 2005/0091413 A1 * | 4/2005 | Walbeck et al. | 709/251 |
| 2005/0220026 A1 * | 10/2005 | Dziong et al. | 370/237 |

FOREIGN PATENT DOCUMENTS

| | | |
|---|---|---|
| CA | 2372853 | 8/2002 |
| CN | 1158063 | 8/1997 |
| CN | 1285041 A | 2/2001 |
| CN | 1402560 A | 3/2003 |
| CN | 1446011 A | 10/2003 |
| CN | 1449610 | 10/2003 |
| CN | 1449610 A | 10/2003 |

(Continued)

OTHER PUBLICATIONS

Kodialam, M.; Lakshman, T.V.;"Dynamic routing of bandwidth guaranteed tunnels with restoration" INFOCOM 2000. Nineteenth Annual Joint Conference of the IEEE Computer and Communications Societies. Proceedings. IEEE vol. 2; 2000 , pp. 902-911 vol. 2 [retreived from IEEE database on Jun. 5, 2010].*
NPL "Ethernet PONs: A survey of Dynamic bandwidth Allocation (DBA) Algorithms", by McGarry et al.*
NPL "Full-RCMA: A High Utilization EPON", by Foh et al.*
NPL "Quality of Service in Two-Stage Ethernet Passive Optical Access Networks", by Shami et al.*
NPL "A Novel Decentralized Ethernet-Based PON Access Architecture for Provisioning Differentiated QoS ", by Sherif et al.*

(Continued)

*Primary Examiner* — Saleh Najjar
*Assistant Examiner* — Oleg Korsak
(74) *Attorney, Agent, or Firm* — Schwegman, Lundberg & Woessner, P.A.

(57) ABSTRACT

Methods, systems, and apparatus guarantee bandwidth for a network transaction. A network is logically organized as a tree having a plurality of nodes. Each node can guarantee service for a network transaction through the network. Each node monitors its traffic and reserves predefined amounts of unused bandwidth with its adjacent node. If a particular node needs additional bandwidth, that node borrows the bandwidth from its adjacent node.

28 Claims, 4 Drawing Sheets

(56) References Cited

FOREIGN PATENT DOCUMENTS

| | | |
|---|---|---|
| DE | 60216534 | 1/2007 |
| EP | 1202501 | 5/2002 |
| EP | 1249973 | 10/2002 |
| EP | 1249973 A2 | 10/2002 |
| EP | 1300995 | 4/2003 |
| JP | 10336197 A2 | 12/1998 |
| JP | 00-216818 | 8/2000 |
| JP | 01048819 | 2/2001 |
| JP | 01121834 | 5/2001 |
| JP | 02044550 | 2/2002 |
| JP | 03-008632 | 1/2003 |
| JP | 2003158543 | 5/2003 |
| JP | 3716927 | 11/2005 |
| WO | WO-9826612 | 6/1998 |
| WO | WO 0195641 A2 * | 12/2001 |
| WO | WO-2005067203 A1 | 7/2005 |

OTHER PUBLICATIONS 2005-513052, "Japanese Application Serial No. 2005-513052 , Office Action mailed Mar. 17, 2009", 15 pgs.

"Chinese Application Serial No. 200380110929.X, Office Action mailed Dec. 26, 2008", 21 pgs.

"European Application Serial No. 03788750.2, Office Action mailed Jan. 19, 2009", 11 pgs.

"Chinese Application Serial No. 200380110929.X, Office Action mailed Jun. 5, 2009", 4 pgs.

"European Application Serial No. 03788750.2, Office Action mailed Nov. 18, 2010", 5 Pgs.

* cited by examiner

TECHNIQUES FOR GUARANTEEING BANDWIDTH WITH AGGREGATE TRAFFIC

This application is a continuation under 35 U.S.C. 111(a) of International Application No. PCT/CN2003/001141, filed on Dec. 30, 2003, and published in English on Jul. 21, 2005 as International Publication No. WO 2005/067203 A1, which is incorporated herein by reference.

TECHNICAL FIELD

Embodiments of the present invention relate generally to computer networks, and more particularly to bandwidth management for network traffic.

BACKGROUND INFORMATION

Quality of Service (QoS) is the concept that transmission rates, error rates, and other network transmission characteristics can be measured, improved, and to some extent guaranteed in advance of a network transmission. QoS is a significant concern for high bandwidth networks that regularly transmit large amounts of data such as video, audio, multimedia, and the like. Moreover, QoS is problematic for geographically dispersed networks, such as the Internet, where any single network transaction can span multiple sub-networks through multiple Internet Service Providers (ISPs).

Attempts to provide decent QoS architectures often suffer from scalability issues. That is, independent sub-networks (e.g., ISPs) are required to be too heavily dependent upon one another to produce any viable commercial solution. As soon as independent sub-networks become dependent upon the operational specifics of other sub-networks, they become less scalable and less desirable. When scalability is adequately achieved, the result is usually achieved with overly complex implementation schemes that dramatically decrease network throughput at the expense of providing scalability.

Accordingly a more scalable QoS technique for large geographically disperse networks is needed, where scalability is achieved in a manner that does not significantly impact network throughput and is not overly complex.

DESCRIPTION OF THE EMBODIMENTS

Figure 1:
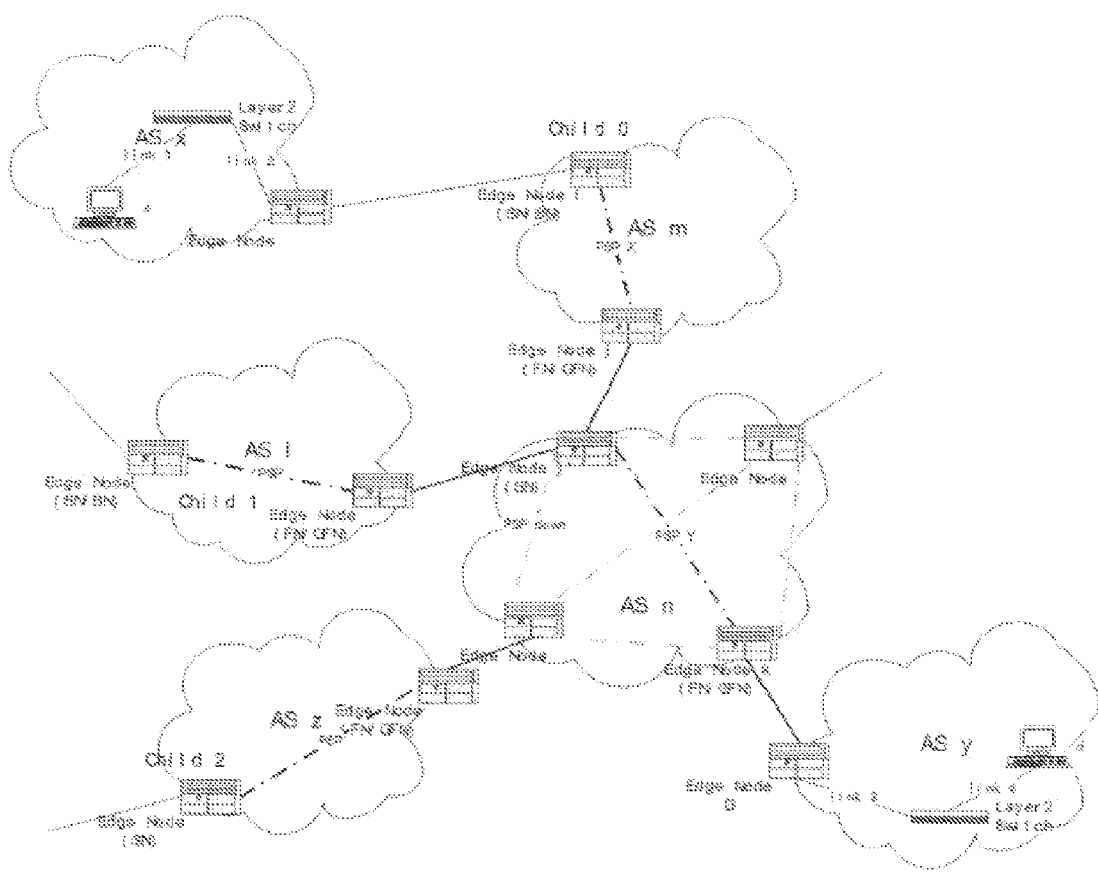
FIG. 1 is diagram of a network to guarantee service in accordance with one embodiment of the invention.

FIG. 1 is a diagram of a network 100 that guarantees service for network transactions before the transactions are processed within the network 100. The technique is implemented in a computer-accessible medium within processing devices of a network. These devices can be routers, hubs, bridges, switches, gateways, firewalls, proxies, servers, client workstations, and the like. The network 100 is logically represented in the computer-accessible medium as a tree where each branch of the tree is a node. A node is a processing device that participates in a network transaction by routing data packets associated with the network transaction between originating nodes and destination nodes.

The embodiments of this invention provide improved techniques for guaranteeing service between node of a network 100. Guaranteeing means that bandwidth availability is assured before a network transaction commences, assuming that the nodes and links of the network 100 remain operational and do not otherwise fail. One of ordinary skill in the art readily appreciates that an absolute assurance that a network transaction will complete within a network 100 is not feasible, since links and nodes can fail abnormally due to hardware or software failures, or links and nodes can fail due to planned maintenance activity.

The network 100 depicted in FIG. 1 includes a variety of Autonomous Systems (AS) that can operate independently of one another. These ASs can be viewed as independent sub-networks, such as ISPs, private networks and the like. The sub-networks can geographically span the entire world. Within each AS, a number of processing nodes are used to directly communicate with other external ASs; these nodes are referred to as edge nodes.

The entire network 100 is logically organized as a tree. In FIG. 1, that tree is inverted, such that the root of the tree is identified by AS Y and the farthest leaf is identified by AS X. The root node of the tree is edge node D. AS N is a father of children 0, 1, and 2. Moreover, the children are considered brothers to each other. Each AS can itself be considered a sub-tree, having its own internal root node, father node, and brother nodes. Moreover, the children of a father are considered its sons. Thus, father AS N has sons identified as Child 0, Child 1, and Child 2. Moreover, AS N is considered a grandfather of AS X.

A network transaction is a communication between any two or more nodes of the network 100. A node that originates the network transaction is called an originating node. A network transaction transfers data packets from an originating node to a destination node. Thus, the node that the originating node desires to communicate with via a network transaction is referred to as a destination node. A network transaction will include the transfer of one or more network data packets from the originating node through one or more intermediate nodes to the destination node. Thus, the network transaction is associated with a path through the network from the originating node to the destination node. A variety of path generating and dynamic modifying algorithms are well known in the networking arts and readily achievable using existing network architectures and protocols. All such algorithms and architectures are capable of being used with the embodiments of this invention.

The volume of and rate at which network packets are present and sent between any two nodes of the network 100, is referred to as the bandwidth. These data transfers occur over the links of the network 100, the links connect the nodes. Each link can be capable of handling different types of media, different volumes, different rates, and a different number of concurrent sessions of network transactions. The hard and soft limitations of each link are known in advance by each node based on its hardware and software configurations. These limitations can be communicated between nodes using well known and existing network protocols and technologies.

When an originating node requests a particular network transaction directed to a destination node, the originating node would like to know in advance of commencing the transaction that a sufficient amount of bandwidth will exist within the network 100 in order to process the transaction to the destination node. In embodiments of the present invention, this is achieved with a Bandwidth Conservation Criterion (BCC) calculation. The originating node makes a request for a network transaction to the first processing node defined in the network path. The first processing node identifies the total available bandwidth of the destination node and sums the bandwidth of all outstanding traffic that is destined for the destination node. This calculation is the BCC calculation that guarantees the originating node that bandwidth will exist to satisfy the transaction. In response to the guarantee, the originating node commences the network transaction through the network 100.

As an example, consider an originating node A that request a network transaction requiring 10 KB of bandwidth. The transaction is directed to destination node N and is initially requested of initial processing node B. N can have a maximum bandwidth of 128 KB. When A makes the request to B, the current aggregate traffic directed to N is 110 KB.

In the present example, B applies BCC to determine that if the network transaction is guaranteed there will be 120 KB of current traffic directed towards N, which is less than the maximum bandwidth of 128 KB that N can handle at any point in time. Thus, B makes the BCC calculation when it receives the request from A and determines that the network transaction can be guaranteed. The guarantee is then communicated from B to A, and the network transaction commences.

BCC can be defined with the following equations, where the originating node is the node identified in AS X and the destination node is edge node D of AS Y (the root of the tree):

$$\begin{cases} \sum_i r_{ij}^D \le r_{jk}^D \\ B_{ij}^X = \sum_y r_{ij}^y \end{cases}$$

$B_{ij}^X$ is the overall bandwidth of AS X available between edge nodes i and j and $r_{ij}^D$, the corresponding portion of AS X in the tree rooted by edge node D. Thus, if the bandwidth request associated with a network transaction when combined with the total aggregate bandwidth destined for edge node D is less than the total bandwidth that edge node D can handle, the BCC equation holds true and a network transaction can be guaranteed service.

This calculation is a scalable approach, because all that is needed is a calculation that sums existing aggregate traffic that is being directed to a destination node along with the known bandwidth limit associated with the destination node. By aggregate traffic it is meant that all current network traffic that is active in the network and is currently being directed to the destination node. However, at any given point as the network transaction is progressing through the network 100, one or more nodes may not have sufficient bandwidth to handle the network request. Thus, BCC can be augmented to make necessary dynamic adjustments as needed at each processing node associated with a network path of a network transaction, which is guaranteed by the BCC equation.

For example, a network transaction may progress after a guarantee of service from AS M to edge node j' of AS Y. At this point in time, however, the current bandwidth for the link between node j' and k (link j'-k) may be at capacity and not capable of handling the network transaction. Without the ability for link j'-k to increase its bandwidth the transaction may fail or become unreasonably delayed. Thus, the static approach of BCC can be augmented with a Closest relation AllocatioN (CLAN) technique, that permits nodes to borrow bandwidth from adjacent (brother, son, father) nodes.

With the CLAN technique, each node of the network 100 monitors the traffic volume occurring with its link to its adjacent nodes, more specifically with its father node. When a particular node notices a reduction in bandwidth occurring with its link to its father node, that reduction is known to the father node (adjacent node). This reserved bandwidth is held by the father node and delivered to other more needing sons of the father when needed.

Thus, in the example, presented above, if the link j'-k can hold 128 KB volume and is at capacity when a network transaction comes along that needs to reach node k, then node k can borrow 64 KB from one or both of its two remaining sons. Node k knows the 64 KB is obtainable from one or its two remaining sons, because it finds the two remaining sons having chunks of available bandwidth to their father node K during processing and request bandwidth from their father node when needed.

For example, consider that the three links to node k each have a total bandwidth capacity of 128 KB and consider further that each son node is configured to manage only 64 KB of capacity at any one time and configured to release and to notify the father node k whenever bandwidth is needed above 64 KB and the father node will be aware when capacity above 64 KB is no longer needed for any given transaction. The father node k then manages this excess bandwidth and when a network transaction moving from link j'-k, in our present example, needs additional bandwidth; the father node k has it in reserve to deliver to the son node j', because the bandwidth has been previously borrowed from one or both brothers of node j'.

Borrowing can occur between any two adjacent nodes or brother nodes. Moreover, the borrowing need not occur within a single AS. For example edge node j' connects two different ASs (L and M) to AS N. Thus, edge node j of AS M can borrow from the appropriate edge node of AS L in order to complete a transaction over link j-j'. This occurs through j', which acts as an adjacent node or father node to both node j and the edge node of AS L that directly connects to node j'.

Thus, with CLAN, adjacent nodes establish policies with one another such that chunks of bandwidth are managed by father nodes on behalf of their sons. These chunks of bandwidth are considered reserves, which must be requested before the reserves can be used from the appropriate father node. Thus, son nodes borrow, via their father, bandwidth that exceeds a pre-negotiated amount; the bandwidth borrowed comes form the brother nodes of a borrowing son node, but is managed by their father node. In a similar fashion father node can borrow from its father within the network 100, such that at any one time a borrowing node may be getting bandwidth from its brothers and from brothers of its father.

Hierarchical relationships between nodes of a network are managed in order to borrow bandwidth with the CLAN technique; the borrowing is needed for a network transaction that is progressing through nodes of a network. That is, a node in need of more bandwidth uses its closest relationship to adjacent nodes to acquire the necessary bandwidth allocation and this borrowing can progress upward through that node's relatives after first borrowing from its closest relation.

Further, the BCC calculation permits a transaction guarantee to be given to an originating node of a network transaction, where that network transaction requires a certain amount of bandwidth through a network 100 in order to reach a destination node. Moreover, as the network transaction progresses through the network 100, if any particular link between nodes lacks sufficient bandwidth to process the transaction, the bandwidth can be temporarily borrowed from adjacent nodes using the CLAN technique. The BCC and CLAN techniques provide a scalable solution to QoS for ASs or independent networks. These techniques are not overly complex and can be implemented within existing network protocols and software designed to calculate the BCC and implement the CLAN technique.

Figure 2:
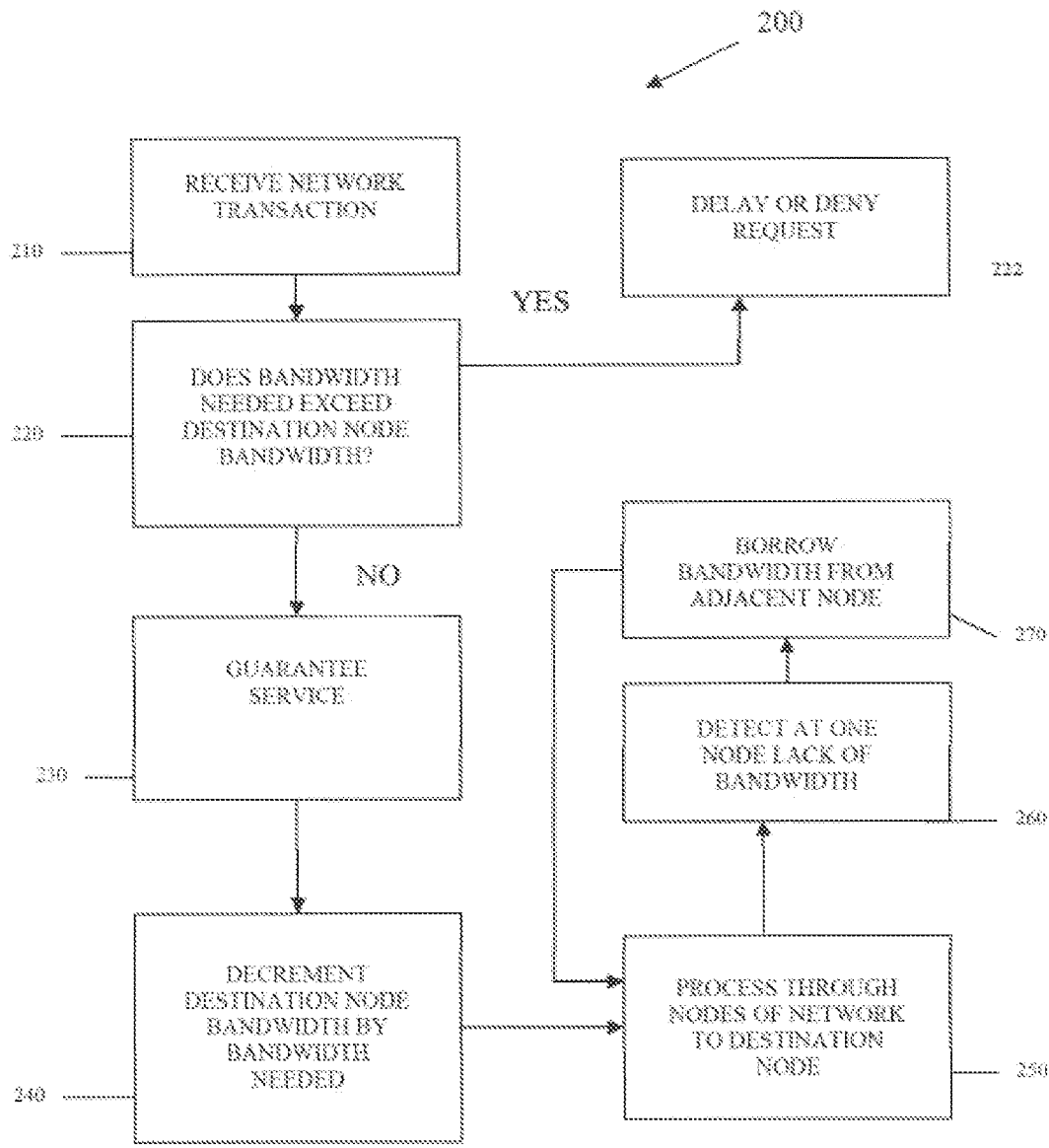
FIG. 2 is a flow diagram of a method to guarantee network service in accordance with one embodiment of the invention.

FIG. 2 is a flow diagram of one method 200 to guarantee network service by implementing the BCC and CLAN techniques discussed above with FIG. 1. The method 200 is implemented in a computer accessible medium and processes on each node of a network. The nodes are processing devices in the network which originate, route, and process network transactions through a network. The method 200 can be implemented within each node of the network as software, firmware, and/or via network protocols.

Initially, at 210, a request for a network transaction is received by a first processing node. The request originates from an originating node. The network transaction is associated with a network path which defines one or more routes for network packets associated with the network transaction to traverse through one or more intermediate nodes of the network to a destination node. The first processing node is the first node of that network path.

When the first processing node receives the network request from the originating node, it determines whether the request is acceptable based on the BCC calculation by checking if the aggregate traffic existing in the network which is destined for the destination node plus the bandwidth needed by the network transaction exceeds the destination node's maximum bandwidth. The BCC calculation and the appropriate check are made at 220. If the aggregate traffic plus the bandwidth needed does exceed the destination node's bandwidth limit, then, at 222, the network transaction cannot be guaranteed and the originating node is notified of the same.

However, if at 220, the aggregate traffic plus the bandwidth needed does not exceed the destination node's bandwidth limit, then, at 230, the first processing node guarantees to the originating node that the requested network transaction will have sufficient bandwidth to reach the destination node within the network. In one embodiment, as soon as this guarantee occurs, the total available bandwidth at the destination node is decremented at 240 by the bandwidth which is needed to satisfy the current network transaction.

Of course there are a variety of ways to implement the BCC calculation. One technique would be to have the destination node keep track of traffic headed its way and maintain a current available bandwidth counter, which is constantly and dynamically changing. Another way is to have each node dynamically make queries to other nodes in the network to dynamically calculate the BCC. One skilled in the art will readily appreciate that other techniques can also exist. All such techniques, which resolve the BCC calculation, are intended to be included in the embodiments of this invention.

Once the first processing node guarantees service, the network transaction commences to process through the network to the destination node at 250. In some embodiments, at some point, during the processing of the network transaction, a particular processing node may determine that it actually lacks the necessary bandwidth needed to process the network transaction through a link to a next node of the network path associated with the network transaction, as depicted at 260. Each node of the network dynamically implements the CLAN technique discussed above with FIG. 1 in order to dynamically resolve this problem.

Accordingly, at 270, the particular processing node that lacks sufficient bandwidth borrows the needed bandwidth from an adjacent node in order to process the network transaction. Thus, the father node of the particular processing node manages reserve bandwidth on behalf of the particular processing node and the particular processing node's brother nodes. These nodes pre-establish with one another the amount of excess bandwidth that the father node will be responsible for managing and delivering, if and when excess bandwidth is needed by any of the sons of the father. Additionally, in some embodiments, the father node of a needy son may not have sufficient bandwidth to satisfy a needing son's bandwidth request. In these situations, the father contacts his father (adjacent node to the father and grandfather of the needing son) in order to borrow bandwidth from brothers of the father (grandfather to the needing son). This borrowing continues as needed according to the rules associated with the CLAN technique, as described above in FIG. 1.

The embodiments of method 200 demonstrate how the BCC and CLAN technique can be implemented and processed within nodes of a network in order to provide a scalable QoS from heterogeneous ASs logically organized as a single network. These embodiments are not complex and can be deployed with software processing on each network node that uses conventional network protocols to communicate between nodes.

Figure 3:
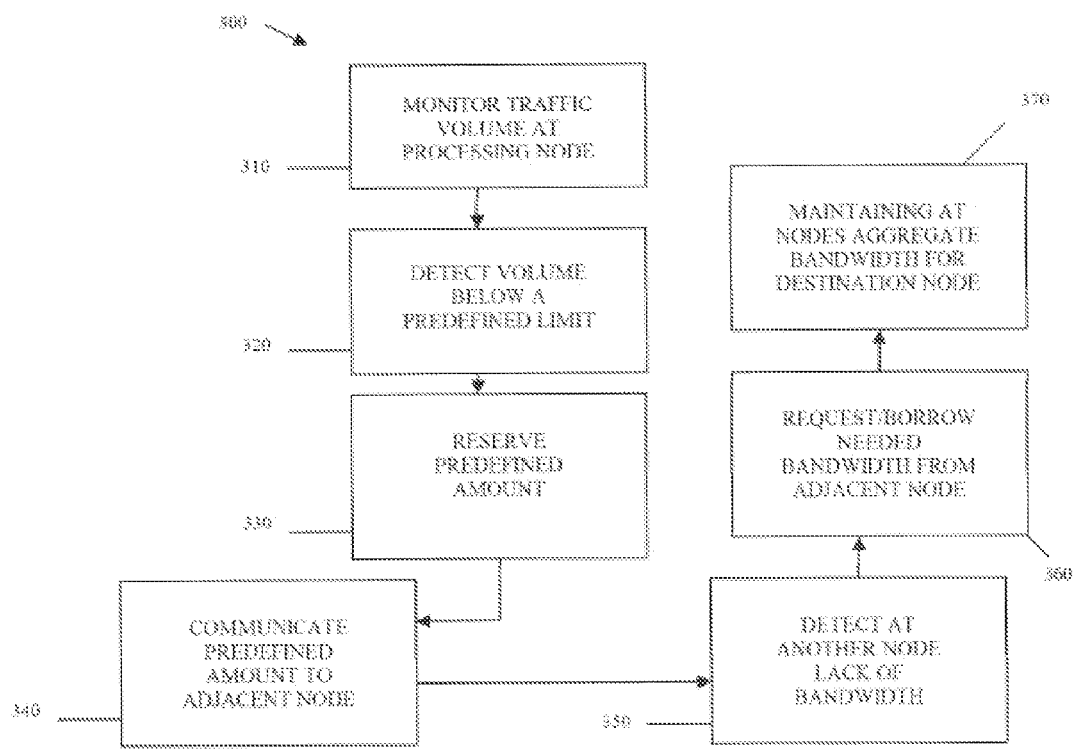
FIG. 3 is a flow diagram of a method to manage bandwidth of a guaranteed network service request in accordance with one embodiment of the invention.

FIG. 3 is a flow diagram of one method 300 to manage bandwidth of a guaranteed network service request. The method 300 is implemented within each node of a network and is implemented in a computer accessible medium. The method 300 represents processing performed by each node and some interactions occurring between nodes during a network transaction. The method 300 represents embodiments of the CLAN technique, where nodes borrow and manage bandwidth within a network during a network transaction.

At 310, a processing node associated with processing a network transaction through a network to a destination node monitors its own traffic volume. The processing node has previously used policies known to its adjacent nodes (brothers, father, and sons) in order to configure it to monitor traffic at specific predefined levels. When traffic falls below the predefined limit, then this is detected at 320, and predefined amounts of bandwidth that are available are reserved as being unavailable to the processing node at 330.

Those predefined amounts of reserved bandwidth are known to the processing node's father node (adjacent node) at 340. The father node manages a pool of reserved bandwidth on behalf of the processing node and on behalf of brothers of the processing node. Thus, at 350, when another node (brother node of the original processing node) is processing its own network transaction and determines that it needs additional bandwidth to process the network transaction through to the father node, the brother node makes a request at 360 to borrow the needed bandwidth from the father node (adjacent node). The brother has directly borrowed the bandwidth from the father, but indirectly borrowed it from the excess capacity that the brother's siblings had previously deposited with the father for purposes of management.

This bandwidth management and borrowing technique reflects an example implementation of the CLAN technique discussed above with FIGS. 1 and 2. Policies about management associated with bandwidth deposits (e.g., reservations) and withdrawals are communicated between adjacent nodes of the network. Moreover, at 370, each node of the network is capable of resolving the BCC calculation when needed by maintaining techniques for resolving (e.g., calculating) the aggregate bandwidth associated with any particular destination node of a particular network transaction.

Method 300 provides an example implementation of the CLAN technique and maintains the capabilities when needed to perform the BCC calculation. This demonstrates how a heterogeneous network consisting of a plurality of nodes can interact in a scalable fashion with one another to provide QoS for a network transaction.

Figure 4:
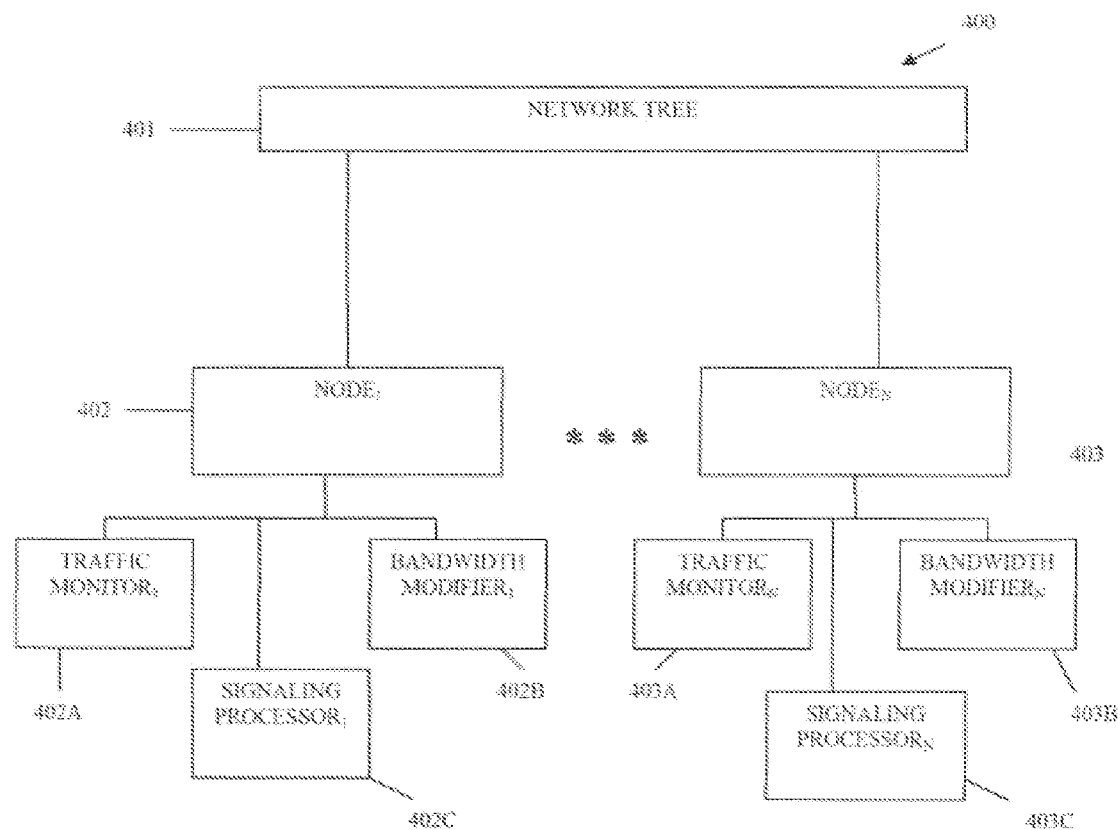
FIG. 4 is a diagram of a bandwidth management system in accordance with one embodiment of the invention.

FIG. 4 is a diagram of one bandwidth management system 400. The bandwidth management system 400 represent an embodiment of the BCC and CLAN technique within a heterogeneous network, where the network includes a plurality of sub-networks identified as ASs. The bandwidth management system 400 is implemented in a computer accessible medium.

The bandwidth management system 400 includes logically representing the heterogeneous network as a network tree 401, wherein branches of the tree 401 can include other sub-trees. The tree 401 can be entirely managed and manipulated by pointers and metadata associated with the attributes and characteristics of the tree 401. The tree 401 includes a plurality of nodes 402 and 403. Each node 402 or 403 assumes a designation as a son, father, and/or brother depending upon its context within the tree to another adjacent node 402 or 403. Thus, a single node 402 or 403 can have multiple designations with respect to adjacent nodes 402 and 403. A node can also have a designation with respect to non-adjacent nodes, such as grandfather, grandson, uncle, and the like.

Each node 402 or 403 also includes its own traffic monitor 402A-403A, bandwidth modifier 402B-403B, and signaling processor 402C-403C. These entities combine both software logic and existing networking protocols to perform the BCC and CLAN technique.

Thus, the traffic monitor 402A-403A monitors traffic on its respective node 402 or 403 and communicates traffic information to the traffic monitors 402A-403A of its adjacent nodes 402 or 403. This communication and monitoring is useful in resolving the processing associated with the BCC and CLAN techniques. For example, traffic volumes can be aggregated to resolve the BCC calculation for a particular destination node of a particular network transaction. Moreover, the traffic volumes can be used to determine whether to deposit bandwidth with or to withdraw or loan bandwidth from an adjacent node 402 or 403.

The bandwidth modifier 402B-403B communicates with the traffic monitor 402A-403A in order to adjust bandwidth associated with its particular processing node 402 or 403. That is, when the traffic monitor 402A-403A reports bandwidth below a predefined and pre-negotiated amount, the bandwidth modifier 402B-403B can be used to implement the CLAN technique and claim additional bandwidth not being used as reserved bandwidth which is then deposited with an adjacent node 402 or 403. Conversely, when a node 402 or 403 needs additional bandwidth, the bandwidth modifier 402B-403B can be used to detect this need based on a current transaction and based on reports of bandwidth usage from the traffic monitor 402A-403A in order to request more bandwidth on loan from an adjacent node 402 or 403.

The signaling processor 402C-403C can be used to actually allocate and reallocate need bandwidth or excess bandwidth from an adjacent node 402 or 403. That is, the actual device that permits bandwidth to be redirected to a specified link can be controlled with the signaling processor 402C-403C. In essence, bandwidth is reallocated and throttled up or throttled down over physical links when bandwidth is deposited or withdrawn from an adjacent node 402 or 403. This throttling is the responsibility of the signaling processor 402C-403C.

During operation, the traffic monitor 402A-403A reports traffic on its node 402 or 403 to the adjacent nodes 402 or 403. The bandwidth modifier 402B-403B uses this in combination with existing network requests to modify bandwidth. The signaling processor 402C-403C detects modified bandwidth and drives the underlying bandwidth device to throttle up and down affected links of the nodes 402 and 403.

The use of the traffic monitor 402A-403A, the bandwidth modifier 402B-403B, and the signaling processor 402C-403C provides a modular event-driven implementation of the BCC and CLAN technique that is scalable across a large heterogeneous network. However, one of ordinary skill in the art appreciates that other implementations and architectures are possible where the functions of the modules are further isolated into more modules or combined into less modules. All such modifications to this architecture that are designed to perform the BCC or CLAN techniques fall within the scope of the embodiments for this invention.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method implemented in a computer-accessible medium to process execute on a processing device, the method, comprising:

receiving a network transaction request from an originating node;

determining a destination node has sufficient bandwidth to satisfy the request;

informing the originating node that service is guaranteed to a destination node via a plurality of intermediate nodes; and decrementing from a destination node bandwidth a transaction bandwidth needed for servicing the transaction and assuring that the network transaction has bandwidth to process the network transaction before the network transaction commences using a Bandwidth Conservation Criterion calculation by summing a total aggregate bandwidth that is destined for but not yet reached the destination node and comparing the total aggregate bandwidth against a total bandwidth that the destination node can handle at once and when the total aggregate bandwidth destined for the destination node plus a request bandwidth for servicing the request is less then the total bandwidth that the destination node can handle, the originating node receives the guarantee for servicing the request, total aggregate bandwidth is all current network traffic that is active in a network and is currently being directed to the destination node, the intermediate nodes and the destination node are hierarchically organized in relationships between father nodes and son nodes where a particular son node borrows bandwidth from a particular brother node to the particular son node via a particular father node to both the particular son node and the particular brother node to assure the network transaction, the borrowing occurs via a closest relation allocation technique.

2. The method of claim 1 further comprising processing the network transaction through a network to the destination node.

3. The method of claim 1 further comprising adding the transaction bandwidth needed back to the destination node bandwidth upon completion of the network transaction.

4. The method of claim 1 further comprising:
processing the network transaction;
detecting during the processing at one of the intermediate nodes that bandwidth is at capacity for that one intermediate node so that an insufficient bandwidth is available for the network transaction at that one intermediate node; and
borrowing, by the one intermediate node, from an adjacent node additional bandwidth needed to process the network transaction through the one intermediate node.

5. The method of claim 4 wherein borrowing further includes requesting a reserved bandwidth that the adjacent node previously set aside from another adjacent node.

6. The method of claim 4 wherein borrowing includes additional borrowing, by the adjacent node, from another node that is adjacent to the adjacent node wherein at least a portion of the insufficient bandwidth is borrowed.

7. The method of claim 1 further comprising maintaining and coordinating the destination node bandwidth at the processing node, the intermediate nodes, and the destination node.

8. A method implemented in a computer-accessible medium to process execute on a processing device, the method, comprising:
monitoring traffic volume at a processing node of a network;
detecting that the volume has fallen below a predefined limit by a predefined amount;
reserving the predefined amount, wherein the predefined amount is set aside to assure a particular network transaction and its processing through to a destination node, the predefined amount set aside before that particular network transaction commences processing through the network using a Bandwidth Conservation Criterion calculation by summing a total aggregate bandwidth that is destined for but not yet reached the destination node and comparing the total aggregate bandwidth against a total bandwidth that the destination node can handle at once and when the total aggregate bandwidth destined for the destination node plus the predefined amount is less then the total bandwidth that the destination node can handle, the particular network transaction receives a guarantee for servicing the particular network transaction through to the destination node, total aggregate bandwidth is all current network traffic that is active in the network and is currently being directed to the destination node, and the processing node is an intermediate node that is hierarchically organized in relationships with brother nodes and a father node and the processing node borrows bandwidth from one or more of the brother nodes to guarantee service, the borrowed bandwidth occurs via the father node using a closest relation allocation technique; and
communicating the reserved predefined amount to an adjacent node.

9. The method of claim 8 further comprising:
detecting a network transaction request that exceeds an available bandwidth at a different processing node; and
requesting a needed bandwidth amount to service the network transaction from the reserved predefined amount held by the adjacent node.

10. The method of claim 8 further comprising adding the reserved predefined amount to an available bandwidth at the adjacent node.

11. The method of claim 10 further comprising decrementing, at the adjacent node, a requested bandwidth amount from the available bandwidth after receiving a needed bandwidth request from a different processing node.

12. The method of claim 11 further comprising borrowing, at the adjacent node, from an adjacent node that is adjacent to the adjacent node, at least a portion of the requested bandwidth amount if the requested bandwidth amount exceeds the available bandwidth.

13. The method of claim 8 further comprising maintaining by the processing node a list of nodes connected directly to the processing node which includes the adjacent node.

14. The method of claim 8 further comprising maintaining by the processing node an aggregate total bandwidth available at the destination node.

15. A system, comprising:
an originating node to make a request for a network transaction which is directed to a destination node within a network; and
a first processing node to initially receive the request, wherein the first processing node determines whether the destination node can satisfy the network transaction and if so assures the originating node that sufficient bandwidth is available in the network to complete the network transaction through the first processing node before the network transaction commences through the network, one or more intermediate nodes, and the destination node via a Bandwidth Conservation Criterion calculation by summing a total aggregate bandwidth that is destined for but not yet reached the destination node and comparing the total aggregate bandwidth against a total bandwidth that the destination node can handle at once and when the total aggregate bandwidth destined for the destination node plus a request bandwidth for servicing the request is less then the total bandwidth that the destination node can handle, the originating node receives a guarantee for servicing the request, total aggregate bandwidth is all current network traffic that is active in the network and is currently being directed to the destination node, the intermediate nodes and the destination nodes hierarchically organized in relationships as father nodes and son nodes, each son node having one or more brother nodes, and each son node borrows bandwidth from one or more of the brother nodes via a corresponding father node using a closest relation allocation technique to guarantee service from the originating node through the intermediate node to the destination node.

16. The system of claim 15 wherein the first processing node communicates a transaction bandwidth needed for the network transaction to a next processing node, which is one of the one or more intermediate nodes, and wherein the transaction bandwidth needed is successively communicated throughout the network to the remaining intermediate nodes and the destination node.

17. The system of claim 15 wherein the originating node and the first processing node commence processing the network transaction after the originating node receives the guarantee.

18. The system of claim 17 wherein one of the intermediate nodes detects that it lacks sufficient bandwidth to process the network transaction, and wherein the one intermediate node borrows the sufficient bandwidth from one of its adjacent nodes to process the network transaction.

19. The system of claim 18, wherein the one intermediate node borrows the sufficient bandwidth by reclaiming previously reserved bandwidth which was communicated to its adjacent node by another node.

20. A non-transitory computer-readable storage medium having associated data, which when accessed, results in a machine at a node of a network performing:
   detecting, at a processing node, that network traffic volume falls below a predefined threshold by a predefined amount;
   reserving the predefined amount as being unavailable for network traffic, wherein the predefined amount is set aside to assure a particular network transaction and its processing through to a destination node, the predefined amount set aside before that particular network transaction commences processing through the network using a Bandwidth Conservation Criterion calculation by summing a total aggregate bandwidth that is destined for but not yet reached the destination node and comparing the total aggregate bandwidth against a total bandwidth that the destination node can handle at once and when the total aggregate bandwidth destined for the destination node plus the predefined amount is less then the total bandwidth that the destination node can handle, the particular network transaction receives a guarantee for servicing the particular network transaction through to the destination node, total aggregate bandwidth is all current network traffic that is active in the network and is currently being directed to the destination node, and the processing node is an intermediate node that is hierarchically organized in relationships with brother nodes and a father node and the processing node borrows bandwidth from one or more of the brother nodes to guarantee service, the borrowed bandwidth occurs via the father node using a closest relation allocation technique; and
   communicating the predefined amount to an adjacent node.

21. The medium of claim 20 wherein the machine further performs claiming, by another node, at least a portion of the predefined amount from the adjacent node when a network transaction is detected that requires additional bandwidth.

22. The medium of claim 21 wherein the machine further performs borrowing, by the adjacent node, from another node that is adjacent to the adjacent node, an additional bandwidth to satisfy a request from another processing node if the request exceeds the previously reserved predefined amount.

23. The medium of claim 20 wherein the machine further performs maintaining a total available bandwidth for the destination node of a network transaction at the processing node, the adjacent node, one or more intermediate nodes, and the destination node.

24. An apparatus comprising:
   a network node to process a network transaction, the network node comprising:
      a traffic monitor to monitor network traffic and to communicate that network traffic to an adjacent node;
      a bandwidth modifier to adjust bandwidth allocation based on communication with the traffic monitor; and
      a signaling processor to allocate available bandwidth based on communication with the traffic monitor and the bandwidth modifier; and
   wherein the node uses its traffic monitor, bandwidth modifier, and signaling processor to reserve a predefined amount of bandwidth if it becomes available in advance of any request for that predefined amount and communicates that reservation to the adjacent node and wherein the amount of bandwidth is reserved before network traffic is commenced through the network via a Bandwidth Conservation Criterion calculation by summing a total aggregate bandwidth that is destined for but not yet reached a destination node and comparing the total aggregate bandwidth against a total bandwidth that the destination node can handle at once and when the total aggregate bandwidth destined for the destination node plus the predefined amount is less then the total bandwidth that the destination node can handle, a particular request receives a guarantee for servicing the particular request through to the destination node, total aggregate bandwidth is all current network traffic that is active in the network and is currently being directed to the destination node, and the network node is an intermediate node that is hierarchically organized in relationships with brother nodes and a father node and the network node borrows bandwidth from one or more of the brother nodes to guarantee service, the borrowed bandwidth occurs via the father node using a closest relation allocation technique.

25. The apparatus of claim 24 wherein the node is adapted to request additional bandwidth from the adjacent node through the traffic monitor, bandwidth modifier, and signaling processor if needed.

26. The apparatus of claim 24 wherein the node maintains a total available bandwidth for a destination node of a network and guarantees service to an originating node of a network transaction, if sufficient bandwidth exists based to the destination node.

27. The apparatus of claim 24 wherein the node maintains links to the adjacent node and other nodes, and wherein the links represent the node's location within a tree that logically represents a network.

28. The apparatus of claim 27 wherein the node and the links define a designation or relationship for the node with respect to the adjacent node and the other nodes of the tree.

* * * * *

UNITED STATES PATENT AND TRADEMARK OFFICE
CERTIFICATE OF CORRECTION

Page 1 of 1

PATENT NO. : 8,631,151 B2
APPLICATION NO. : 11/383980
DATED : January 14, 2014
INVENTOR(S) : Hua You It is certified that error appears in the above-identified patent and that said Letters Patent is hereby corrected as shown below:

On the title page, in column 2, under item (56) "Other Publications", line 1, delete "T.V.;"Dynamic" and insert --T. V.; "Dynamic--, therefor On the title page, in column 2, under item (56) "Other Publications", line 4, delete "2000 ," and insert --2000,--, therefor On title page 2, in column 2, under item (56) "Other Publications", line 1, before ""Japanese", delete "2005-513052,", therefor On title page 2, in column 2, under item (56) "Other Publications", line 1, delete "2005-513052 ," and insert --2005-513052,--, therefor In the Claims:

In column 12, line 13, in Claim 24, after "modifier;", delete "and", therefor

Signed and Sealed this
Twenty-ninth Day of April, 2014

Michelle K. Lee
*Deputy Director of the United States Patent and Trademark Office*